United States Patent
Wittenberg

(10) Patent No.: US 6,646,440 B1
(45) Date of Patent: Nov. 11, 2003

(54) DEVICE FOR MEASURING SHIFTS IN MOUNTAINS

(75) Inventor: Dieter Wittenberg, Dortmund (DE)

(73) Assignee: DMT Deutsche Montan Technologie GmbH, Essen (DE)

( * ) Notice: Subject to any disclaimer, the term of this patent is extended or adjusted under 35 U.S.C. 154(b) by 0 days.

(21) Appl. No.: 09/958,166

(22) PCT Filed: Jun. 7, 2000

(86) PCT No.: PCT/EP00/05282

§ 371 (c)(1), (2), (4) Date: Oct. 4, 2001

(87) PCT Pub. No.: WO00/75604

PCT Pub. Date: Dec. 14, 2000

(30) Foreign Application Priority Data

Jun. 7, 1999 (DE) .......................... 199 25 733

(51) Int. Cl.⁷ .......................... G01V 3/00; E21B 47/00
(52) U.S. Cl. ............. 324/323; 324/347; 73/152.54
(58) Field of Search ................ 324/699, 527, 324/52, 347, 323; 73/88, 152.54, 152.56, 152.59, 760

(56) References Cited

U.S. PATENT DOCUMENTS 3,477,019 A * 11/1969 Hartmann .................... 324/519
4,348,635 A * 9/1982 Wright et al. ............... 324/559

FOREIGN PATENT DOCUMENTS

| DE | 1 773 862 | 8/1971 |
| DE | 29 41 776 | 4/1981 |
| WO | WO 86/04672 | 8/1986 |

* cited by examiner

Primary Examiner—N. Le
Assistant Examiner—Donald M Lair
(74) Attorney, Agent, or Firm—Herbert Dubno

(57) ABSTRACT

Shifts in rock strata are measured be inserting into a bore hole in the rock a conductive tube in which an insulated conductor runs along the length and the continuity is measured between the conductor and the tube. When conductivity is detected, the shift in the strata amounts to the distance required for the tube wall to break the insulation and create an electrical content between the tube and the conductor.

4 Claims, 2 Drawing Sheets

US 6,646,440 B1

DEVICE FOR MEASURING SHIFTS IN MOUNTAINS

CROSS REFERENCE TO RELATED APPLICATIONS

This application is a national stage of PCT/EP00/05282 filed Jun. 7, 2000 and is based upon a German National application 199 25 733.7 of Jun. 7, 1999 under the International Convention.

FIELD OF THE INVENTION

The invention results to a method of measuring shifts in mountains and rock structures and an apparatus suitable therefor.

BACKGROUND OF THE INVENTION

The measurement of shifts in mountains is very important since the results of basic tests according to German Industrial Standard 21521 show that shear stresses can yield the lowest deformation to failure of anchors in the structure. Up to now such measurements were only possible by optical observation (borehole endoscopy). These types of measurement were very expensive.

From German open application 17 73 862, a shear strip device is known for determining ground movements. In this case, shear formed into a tube were arranged in a borehole. Along the tubular shear strip extended two conductors, whereby between the conductors at regular intervals, resistances were arranged. The shear strips were mortared into the borehole and thus held in position. The mortaring of the shear strips into the borehole was very expensive and gave rise to significant difficulties when the borehole was vertical.

OBJECT OF THE INVENTION

The invention has as its object to provide a simple and inexpensive method and apparatus for measuring shifts in rock structures.

SUMMARY OF THE INVENTION

With the method of the invention, initially a borehole is drilled in the rock structure and in this borehole an electrically conductive tube whose diameter corresponds to the borehole diameter is positioned. In the electrically conductive tube there is provided an insulated electrical conductor. Both the electrically conductive tube and the electric conductor are connected to an electric measuring device for continuity measurement.

The apparatus according to the invention is thus comprised of a metal tube, especially a steel tube, in which an insulated electrical conductor is arranged approximately parallel to its longitudinal extent. The steel tube is received in a borehole of approximately identical caliber. Both the steel tube and the electrical conductor are connected to an electrical measuring device for continuity measurement. In this built-in state, no continuity between the electrical conductor and the steel tube is detectable. Should there be a shift, however, in the rock strata or portions of the rock strata, in the anchor penetrating regions which move oppositely, the steel tube will initially be deformed. With further shifts, the steel tube will destroy the insulation of the electrical conductor and a continuity can be detected. When the continuity is detected, the measured travel amounts to:

Measured travel=(borehole diameter)−(2×tube wall thickness)−(conductor diameter)

The detection of the measured travel is basic to the test results in accordance with the principles of German Industrial Standard 21521. Within the framework of these principles, the load bearing and deformation properties of rock anchors under shear stress are investigated. For this purpose, anchors are built into a model rock structure (two concrete blocks: shear plane between both blocks) and then stressed. With the aid of such a characteristic curve, the properties of the built-in anchor under shear can be described. Starting from the maximum deformation at failure of the anchor, different measured travels for the deformation measurement in the rock structure can be determined.

With the aid of different borehole diameters and correspondingly matched apparatuses (metal tubes and insulated conductors) different travel measurements can be realized.

If, for example the steel tube wall thickness is 1 mm and the diameter of the conductor (without insulation) is 10 mm, the following measured travel is obtained for a bore diameter of 52 mm:

Measured travel 1=52 mm−(2×1 mm)−10 mm=40 mm.

If the borehole diameter amounts to 32 mm, the result is:

Measured travel 2=32 mm−(2×1 mm)−10 mm =20 mm.

It is also possible to provide a multiplicity of conductors of different lengths in the steel tube. In this manner, shifts for a multiplicity of different measurements at different horizontal levels can be determined.

It is also possible to arrange a multiplicity of steel tubes inside one another in a single borehole. In this manner multiple measured travel stages can be accommodated in a single borehole.

The aforementioned components which are used in accordance with the invention and are claimed and described in the example do not depend upon their size, shape, choice of material and technological concept for their effect so that they can be used practically without limitation to satisfy any criteria of choice in the respective field of use.

BRIEF DESCRIPTION OF THE DRAWING

Further details, features and advantages of the subject matter of the invention are given in the following description of the associated drawing in which, by way of example, a preferred embodiment of the apparatus for measurement of shifts in rock structures has been illustrated. In the drawing.

SPECIFIC DESCRIPTION

Figure 1:
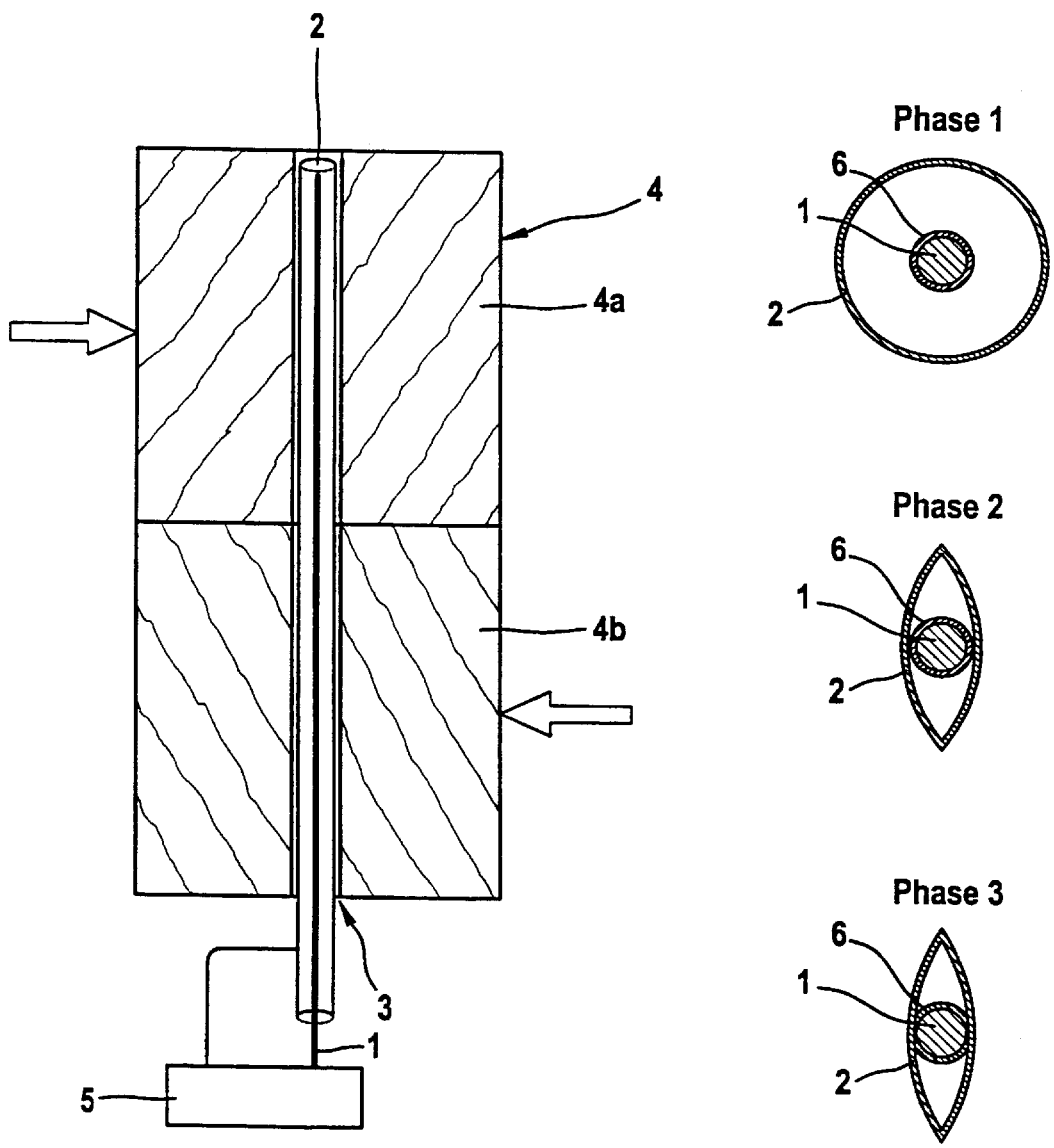
FIG. 1 shows a schematic illustration of the method and the apparatus for measuring shifts in rock structures with an electric conductor.

FIG. 1 shows an electric conductor 1 with an insulator 6. This conductor 1 is disposed with a slight clearance in an electrical conductive tube 2 which is arranged in a borehole 3 of substantially equal diameter in a rock structure 4 so that a wall of the tube is directly juxtaposed with a wall of the borehole. The rock structure 4 is, to clarify the principle, shown as comprising the strata 4a and 4b. On these strata forces act as has been illustrated by arrows. The conductor 1 and the tube 2 are connected to a measuring device 5 for electrical continuity measurements upon a shift in rock structure resulting in a dislocation of the tube directly by engagement of the wall of the borehole with the wall of the tube to press the tube against the conductor through insulation with the conductor.

On the right side of FIG. 1, three phases of measurement are illustrated. The phase 1 corresponds to the state in which the apparatus is introduced into the borehole. No continuity between the conductor 1 and the tube 2 can be measured. In phase 2, shifts in the rock structure have deformed or dislocated the tube 2 so that at the end of phase 2 contact with the undamaged insulation 6 of the conductor 1 by the tube has occurred. No continuity between the conductor 1 and the tube 2 can be measured. In phase 3, the dislocated tube 2, after further shifts in the rock structure 4, has damaged the insulation 6 of the conductor 1. A continuity between the conductor 1 and the tube 2 can be measured through the insulation.

Figure 2:
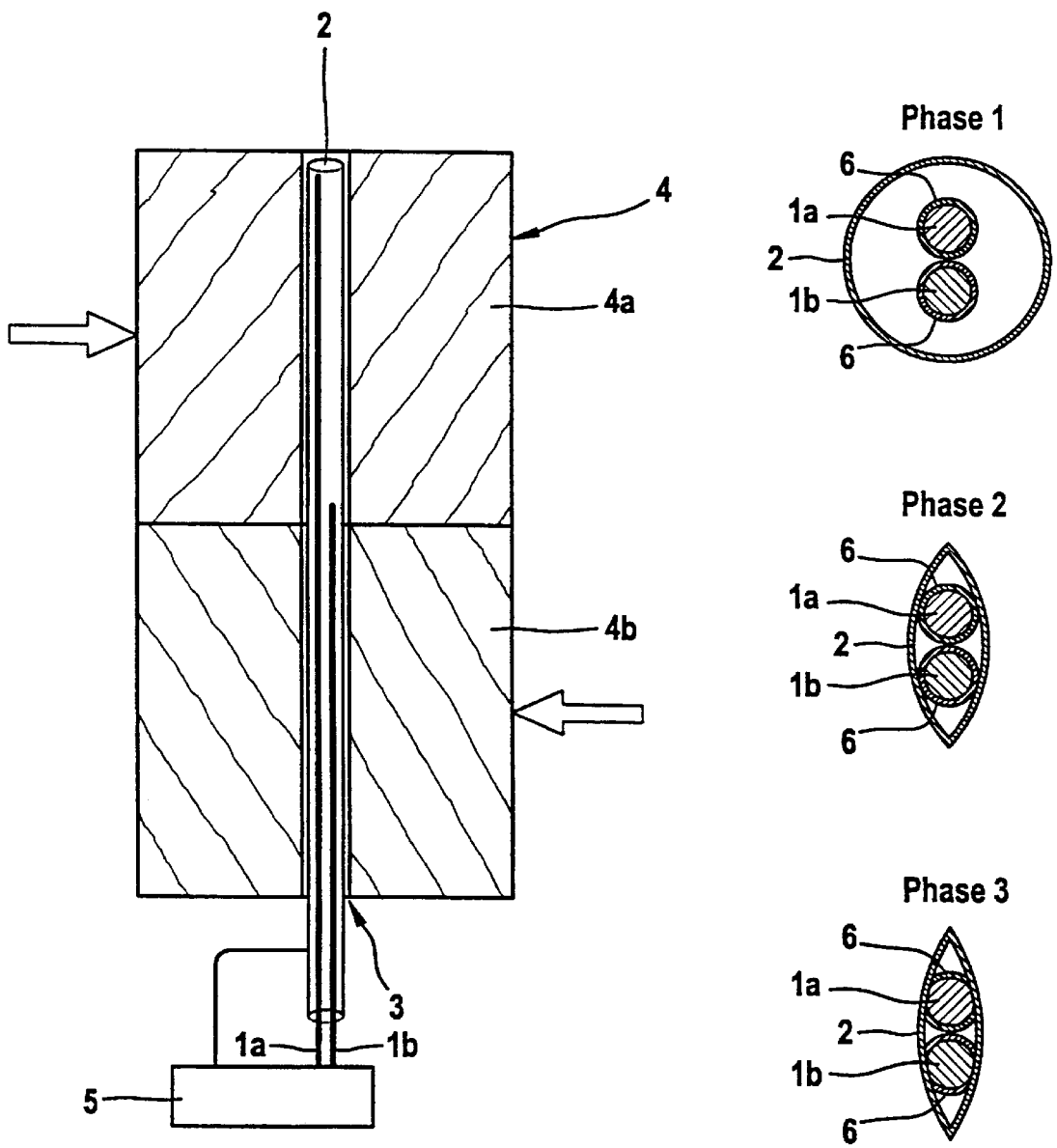
FIG. 2 shows the measurement principle of the method and the apparatus for measuring shifts in rock structures with two electrical conductors of different lengths.

In FIG. 2 the method and the apparatus for measurement of the shifts in the rock structure with two different lengths of electrical conductors 1*a* and 1*b* have been shown. The other reference characters have the same significance as in FIG. 1. In this manner shifts for two horizontal levels can be detected.

Reference Character List

| | |
|---|---|
| 1 | Electrical conductor |
| 1a | Electrical conductor |
| 1b | Electrical conductor |
| 2 | Tube |
| 3 | Borehole |
| 4 | Rock structure |
| 4a | Stratum |
| 4b | Stratum |
| 5 | Electrical measuring device |
| 6 | Insulation |

What is claimed is:

1. A method of measuring shifts in a rock structure comprising the steps of (a) boring a borehole in the rock structure;

(b) inserting in the borehole with a slight clearance at least one electrically conductive tube with at least one insulated electrical conductor extending within the tube parallel to its longitudinal extent so that a wall of the tube is directly juxtaposed with a wall of said borehole, and (c) connecting an electrical measuring device to the tube and the electrical conductor effecting an electrical continuity measurement therebetween upon a shift in rock structure resulting in a dislocation of said tube directly by engagement of the wall of said borehole with the wall of said tube to press said tube against said conductor through insulation on said conductor.

2. An apparatus for measuring shifting in a rock structure provided with a borehole which comprises:

an electrically conductive tube extending in said borehole with a slight clearance so that a wall of the tube is directly juxtaposed with a wall of said borehole;

at least one insulated electrical conductor extending longitudinally in said tube; and an electrical measuring device for continuity measurement connected to the tube and the electrical conductor for effecting a measurement of continuity upon a shift in rock structure resulting in a dislocation of said tube directly by engagement of the wall of said borehole with the wall of said tube to press said tube against said conductor through insulation on said conductor.

3. An apparatus according to claim 2 wherein a multiplicity of different length electrical conductors are provided in the tube.

4. The apparatus according to claim 2 wherein a plurality of electrically conductive tubes are arranged within one another.

* * * * *